US005646938A

United States Patent [19]

Wagener

[11] Patent Number: 5,646,938

[45] Date of Patent: Jul. 8, 1997

[54] DEVICE FOR THE SERIAL EXCHANGE OF DATA BETWEEN TWO STATIONS

[75] Inventor: Martin Wagener, Ditzingen, Germany

[73] Assignee: Robert Bosch GmbH, Stuttgart, Germany

[21] Appl. No.: 560,262

[22] Filed: Nov. 21, 1995

[30] Foreign Application Priority Data

Mar. 27, 1995 [DE] Germany ........................ 195 11 140.0

[51] Int. Cl.$^6$ ........................ H04B 1/56

[52] U.S. Cl. ........................ 370/276

[58] Field of Search ........................ 370/24, 27, 31; 178/71 R, 71 N; 455/15; 330/360, 291

[56] References Cited

U.S. PATENT DOCUMENTS

| | | | |
|---|---|---|---|
| 3,832,489 | 8/1974 | Krishna | 178/71 R |
| 3,835,252 | 9/1974 | Ananiades et al. | 375/257 |
| 3,943,284 | 3/1976 | Nelson | 370/24 |
| 4,477,896 | 10/1984 | Aker | 370/24 |

*Primary Examiner*—Douglas W. Olms
*Assistant Examiner*—Ajit Patel
*Attorney, Agent, or Firm*—Kenyon & Kenyon

[57] ABSTRACT

In a device for the serial exchange of data between two stations, each station has a serial interface which is connected to a common data transmission line. A first specific station has means which, during the reception of data, identify the two possible bit states on the basis of different voltage levels on the data transmission line. In contrast, the second specific station has means which, during the reception of data, identify the two possible bit states on the basis of the presence or absence of a specific current flow via the data transmission line. Furthermore, in another device for the serial exchange of data between two stations, suitable selection of resistors ensures that four different voltage levels are produced on the data transmission line when each station transmits a "1" bit state or a "0" bit state. The voltage levels are evaluated differently by the stations, with the result that simultaneous data transmission in both directions is also possible.

18 Claims, 4 Drawing Sheets

DEVICE FOR THE SERIAL EXCHANGE OF DATA BETWEEN TWO STATIONS

BACKGROUND INFORMATION

A device for the serial exchange of data between two stations is described in the report by H. E. Schurk, W. Weishaupt and S. Bourauel "BMW On-Board-Diagnose" (BMW On-Board Diagnostics), VDI Berichte (VDI Reports) No. 612, 1986, pp. 387–401. In the concept presented in that report, an exchange of data takes place between a motor vehicle controller fitted in a motor vehicle and an externally connectable service tester. For data transmission, one data transmission line TXO is used for both transmission directions. However, the data transmission from the service tester to the motor vehicle controller and vice versa takes place with a time offset; temporally parallel transmission in both directions is not possible.

SUMMARY OF THE INVENTION

The device according to the present invention has the advantage that the simultaneous transmission of data in both transmission directions is possible via a single data transmission line (full duplex communication). More complicated circuitry is not necessary here. On the contrary, one data transmission line is omitted in comparison with full duplex communication with the aid of two separate data transmission lines. On the other hand, in comparison with the concept in accordance with the prior art cited above, in which half duplex communication takes place via a single data transmission line, the amount of time required for the exchange of data is reduced approximately by half. This results in the possibility of expanding the exchange of data in order to achieve a higher information density. The reduction in the delay time requirement in the motor vehicle controller for the exchange of data is further advantageous.

A further advantage is that the motor vehicle controller no longer receives, for example, an echo signal from its own transmission. Therefore, when developing the motor vehicle controller, it is not necessary to provide either in the program or in the hardware complicated means for distinguishing between the received echo signal and the signal transmitted by the externally connectable device, or for masking out the echo signal.

The first station may be, for example, a motor vehicle controller. The station is designed in such a way that, when receiving data, it evaluates different voltage levels on the data transmission line and, when transmitting data, it switches the current flow on and off via the data transmission line.

The second station may be, for example, a diagnostic device or an application device. The second station is designed in such a way that, when transmitting data, it applies specific voltage potentials to the data transmission line depending on the bit state. When receiving data via the data transmission line, the second station evaluates the current flow on the data transmission line.

Simultaneous transmission of data in both transmission directions is permitted via a single data transmission line. In this case, the second station does not evaluate the current flow via the data transmission line, but rather identifies the different bit states using different voltage levels, like the first station. A total of four voltage levels is possible on the data transmission line.

The first station assigns, for example, the bit state "1" to the two higher voltage levels and the bit state "0" to the two lower voltage levels. The second station assigns the bit state "1" to the highest voltage level and to the second lowest voltage level and the bit state "0" to the second highest voltage level and to the lowest voltage level.

In another exemplary embodiment, the second station is implemented in terms of circuitry with regard to the evaluation of the voltage levels. The first station may be unchanged from the first exemplary embodiment.

Advantageous, simple switching means are provided for the purpose of producing the four different voltage levels on the data transmission line.

DETAILED DESCRIPTION

Figure 1:
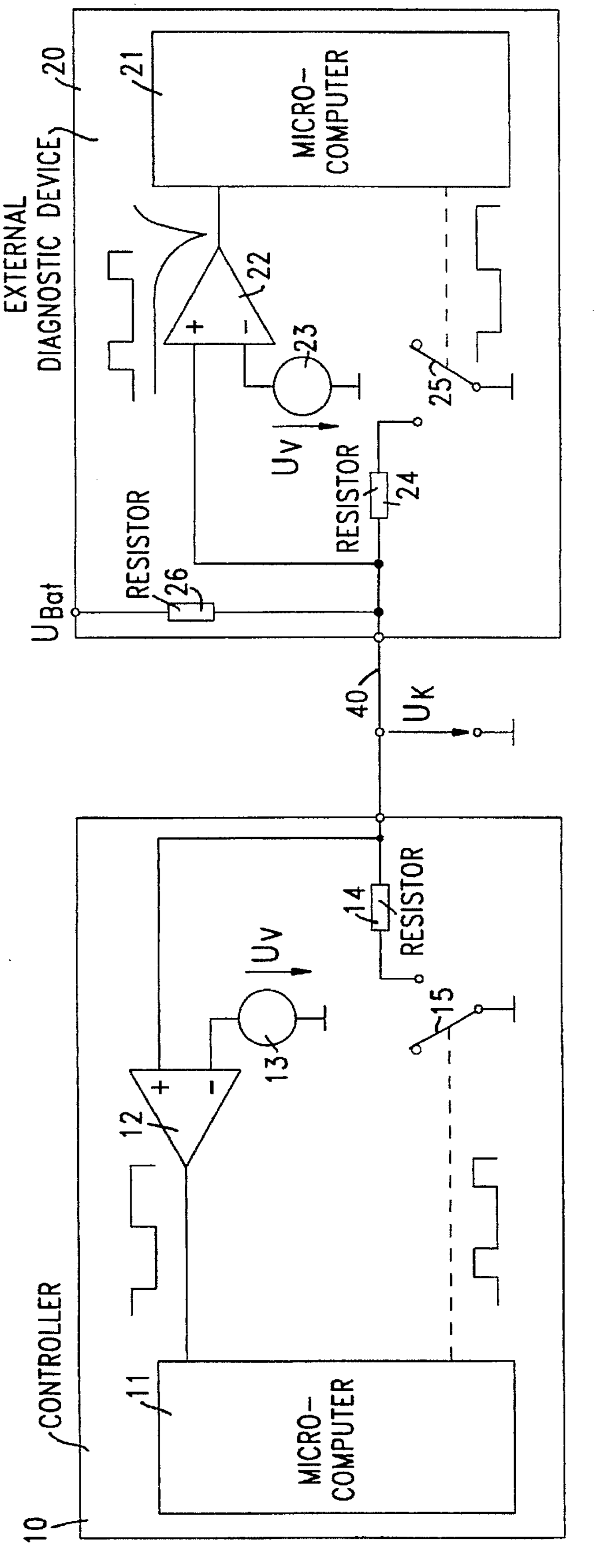
FIG. 1 PRIOR ART
FIG. 1 shows a rough circuit diagram of a device for the serial transmission of data between two stations, such as is known from the prior art.

In FIG. 1, a motor vehicle controller is designated by the reference numeral 10. It may be, for example, an engine controller, a braking controller, a transmission controller, etc. The motor vehicle controller 10 is connected to an external diagnostic device 20 via a data transmission line 40. The connection between the diagnostic device 20 and the motor vehicle controller 10 is established, for example, during servicing of the motor vehicle in a garage. In this case, the motor vehicle controller 10 remains fitted in the motor vehicle itself. With the aid of the external diagnostic device 20, it is possible, for example, to read out the error memory of the motor vehicle controller 10, to carry out a software adjustment of the controller 10 or, for example, also a reprogramming of the memory of the controller 10 if this is necessary on account of altered handling characteristics or on account of the retrofitting of specific parts.

The motor vehicle controller 10 contains a microcomputer 11. A receiving comparator 12 is connected to the microcomputer 11. The data transmission line 40 is connected to the non-inverting input of the receiving comparator 12. A reference voltage source 13 is connected to the inverting input of the receiving comparator 12. The reference potential $U_v$ is prescribed via the reference voltage source 13. A protective resistor 14 is also connected to the data transmission line inside the motor vehicle controller. The resistor is also connected at the other end to a pole of an electronic switch 15. The electronic switch 15 is also connected, for its part, to the ground potential. A quiescent potential is applied to the second switching pole of the electronic switch 15. If the switch is connected to this quiescent potential, the current flow via the transmission line 40 to the ground potential is interrupted. The electronic switch 15 is preferably designed as a semiconductor switch, that is to say as a transistor. The switch is actuated by the microcomputer 11 via a corresponding drive line.

The structure of the external diagnostic device 20 is similar to the structure of the motor vehicle controller 10. The diagnostic device 20 likewise has a microcomputer 21. A receiving comparator 22 is again connected to the microcomputer. The non-inverting input of the receiving comparator is likewise connected to the data transmission line 40. A fixed reference potential Uv is likewise applied to the inverting input of the receiving comparator 22. The reference voltage source 23 is used for this purpose. A protective resistor 24 is likewise connected to the data transmission line 40 inside the external diagnostic device 20. The resistor is also connected at the other end to an electronic switch 25. This electronic switch 25 can also be driven from the microcomputer 21. In contrast to the motor vehicle controller 10, the data transmission line 40 is connected, inside the external diagnostic device 20, via a resistor 26 to the supply voltage $U_{Bat}$ of the external diagnostic device 20.

In the arrangement in accordance with FIG. 1, data transmission can take place via the data transmission line 40 at a prescribed point in time only in one direction in each case. This corresponds to half duplex communication via this serial data transmission line 40.

The case in which the motor vehicle controller 10 transmits data to the external diagnostic device 20 is considered as an example. The switch 15 is opened and closed via the microcomputer 11 in time with the data to be transmitted. At this point in time, the switch 25 of the external diagnostic device 20 must be switched into its quiescent position. Levels of approximately 0 volts and approximately $U_{Bat}$ thus alternate on the data transmission line 40. The receiving comparator 22 compares the voltage which is present in each case with the reference potential $U_v$. The reference potential $U_v$ is selected in such a way that the switching state of the receiving comparator 22 is switched over each time the voltage potential on the data transmission line 40 changes from $U_{Bat}$ to approximately 0 volts, and vice versa. The microcomputer 21 detects the switching states at the output of the receiving comparator 22 and thus receives the transmitted data word. The receiving comparator in the motor vehicle controller 10 also evaluates the same voltage levels on the data transmission line 40 and therefore receives an (interfering) echo of its own transmitted data. Only after the end of the transmission of data from the controller 10 to the external diagnostic device 20 can the external diagnostic device 20 transmit its data in the same way to the controller 10.

Figure 2:
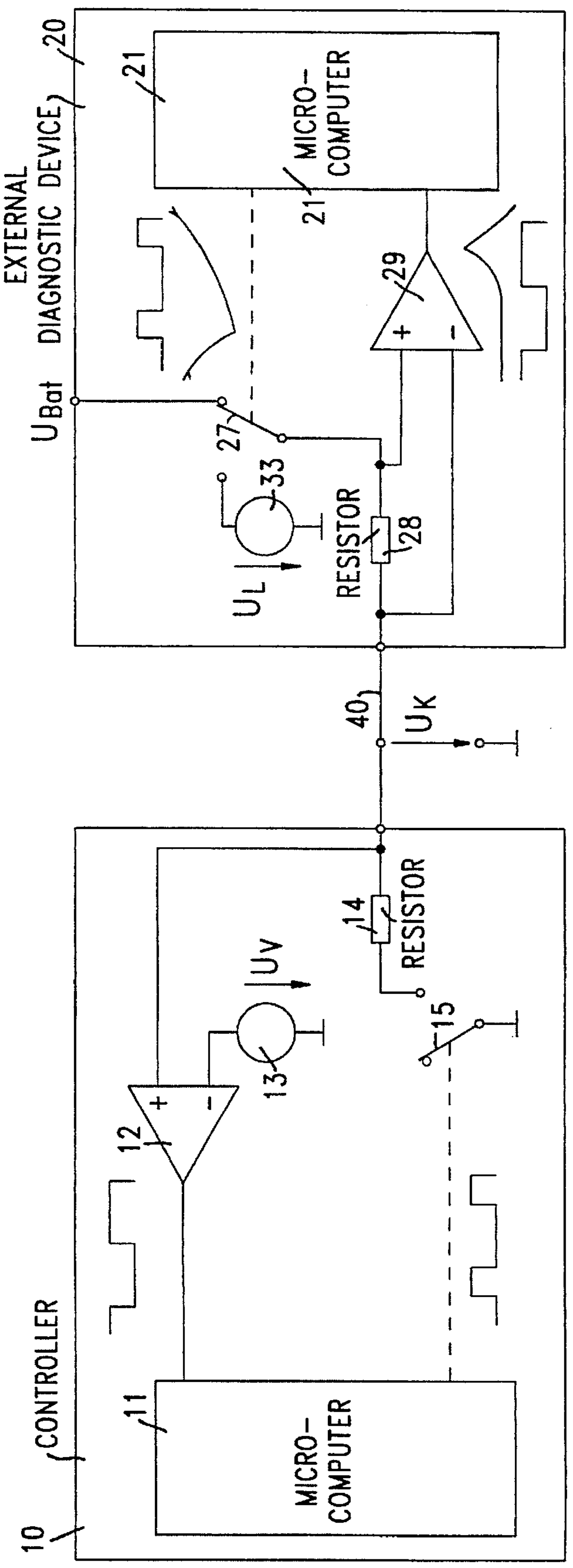
FIG. 2 shows a rough circuit diagram of a first exemplary embodiment of the device according to the present invention for the serial exchange of data between two stations.

In FIG. 2, the same reference numerals designate the same components as in FIG. 1. The motor vehicle controller 10 thus has the same structure as in FIG. 1. However, the structure of the external diagnostic device 20 is different from the arrangement in FIG. 1. For the purpose of transmitting data from the external diagnostic device 20 to the motor vehicle controller 10, there is an electronic switch 27, which can switch back and forth between two voltage potentials $U_{Bat}$ and $U_L$. The voltage potential $U_L$ is provided via the voltage source 33. As a result, when transmitting data from the external diagnostic device 20 to the controller 10, a level change on the data transmission line 40 is ensured, which change is also identified by the receiving comparator 12 and leads to a change in its switching state.

In order to evaluate signals which are applied by the controller 10 to the data transmission line 40, the external diagnostic device 20 has means which measure the current flow on the data transmission line 40. For this purpose, a measuring resistor 28 is connected to the data transmission line 40. The voltage drop across this measuring resistor 28 is measured with the aid of a corresponding comparator 29. When a specific voltage drop exists, the output of the comparator 29 has a different switching state in comparison with the case in which it is not possible to ascertain a voltage drop across the measuring resistor 28. The output of the comparator 29 is connected to the microcomputer 21. In the external diagnostic device, therefore, the data are evaluated by the distinction (current is flowing via the transmission line/current is not flowing via the transmission line). In contrast, the data are evaluated in the motor vehicle controller 10 by the distinction ($U_K>U_v/U_K<U_v$). In the motor vehicle controller 10, it is not the current flow via the data transmission line which is evaluated, but rather the voltage $U_K$ which occurs on the data transmission line 40.

The voltage changes are produced in the external diagnostic device 20 in that the microcomputer 21 switches the switch 27 back and forth, in time with the data to be transmitted, between the two voltage potentials and $U_{Bat}$. As an example of a concrete realization, a value of 12 volts is proposed for the voltage level $U_{Bat}$, a value of approximately 3 volts is proposed for the voltage level $U_L$ and a value of approximately 6 volts is proposed for the voltage level $U_v$.

The data transmission by the controller 10 to the external diagnostic device 20 takes place in the manner mentioned above in that the microcomputer 11 connects the switch 15 to the data transmission line 40 in time with the data to be transmitted, or just interrupts the connection. An appreciable current flow via the data transmission line 40 is possible only when the switch 15 establishes the connection between the ground potential and the data transmission line 40. However, this switching back and forth of the switch 15 is not identified by the receiving comparator 12 in the controller 10. Even if the switch 15 is closed, the voltage across the non-inverting input of the receiving comparator 12 cannot drop below the reference potential $U_v$. This is ensured in that the measuring resistor 28 in the external diagnostic device 20 is designed to have a substantially smaller resistance than the protective resistor 14 in the motor vehicle controller 10.

Therefore, it is possible to transmit data simultaneously in both transmission directions via the data transmission line 14. Erroneous data transmissions due to signal superimposition are prevented.

Figure 3:
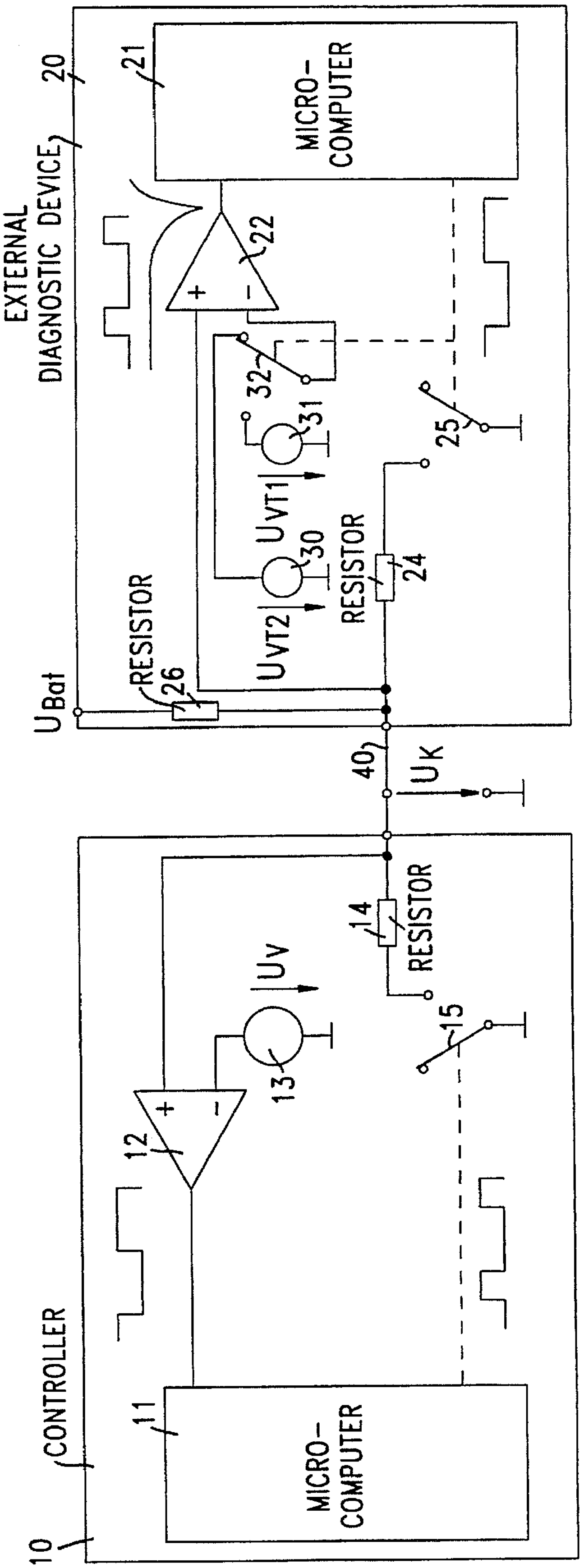
FIG. 3 shows a rough circuit diagram of a second exemplary embodiment of the device according to the present invention for the serial exchange of data between two station.

FIG. 3 illustrates a second embodiment of the present invention. The controller 10 illustrated therein is unchanged from the first embodiment in accordance with FIG. 2, so that its structure does not need to be explained in more detail. However, the structure of the external diagnostic device 20 is different from the arrangement in accordance with FIG. 2. The components which still correspond to the external diagnostic device 20 in accordance with FIG. 1 have the same reference numerals and therefore are not explained again. However, in FIG. 3, in the diagnostic device 20, the inverting input of the receiving comparator 22 can be connected to two different reference voltage sources $U_{VT1}$ (30) and $U_{VT2}$ (31). For this purpose, there is provided a switch 32 which can switch over between the two reference voltage sources. The switch 32 is coupled to the switch 25. It is switched over by the microcomputer 21 by means of the same transmitted clock signal.

Given favorable resistance values of the resistors 14, 24 and 26, the result achieved is that four clearly distinguishable voltage levels are possible on the data transmission line 40. Favorable resistance values may be as follows: the resistor 24 must have a resistance which is approximately half as large as that of the resistor 26. In this case, if the switch 25 of the diagnostic device 20 is closed and the switch 15 of the controller 10 is at the same time open, a voltage of approximately ⅓ $U_{Bat}$ arises. Given the selection of $U_{Bat}$=12V, this corresponds, therefore, to a value of 4V. It is further favorable to select the resistance of the resistor 14 to be approximately twice as large as that of the resistor 26. The result achieved is that if the switch 15 of the controller 10 is closed and, at the same time, the switch 25 of the external diagnostic device 20 is open, a voltage of approximately ⅔ $U_{Bat}$ (8V) arises. Given these resistance values of the resistors, a voltage level of $^2/_7$ $U_{Bat}$ (3.4V) is produced when both the switch 15 and the switch 25 are closed.

Figure 4A:
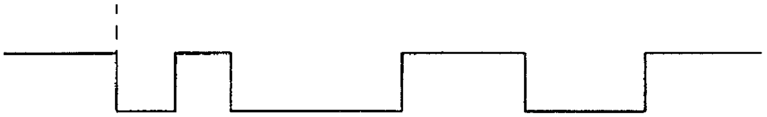
FIG. 4*a* shows a bit stream which is transmitted by the second station in accordance with the second exemplary embodiment.
Figure 4B:
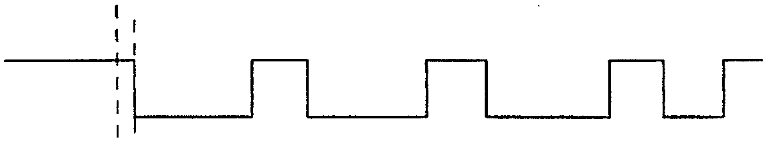
FIG. 4*b* shows a bit stream which is transmitted by the first station in accordance with the second exemplary embodiment.
Figure 4B:
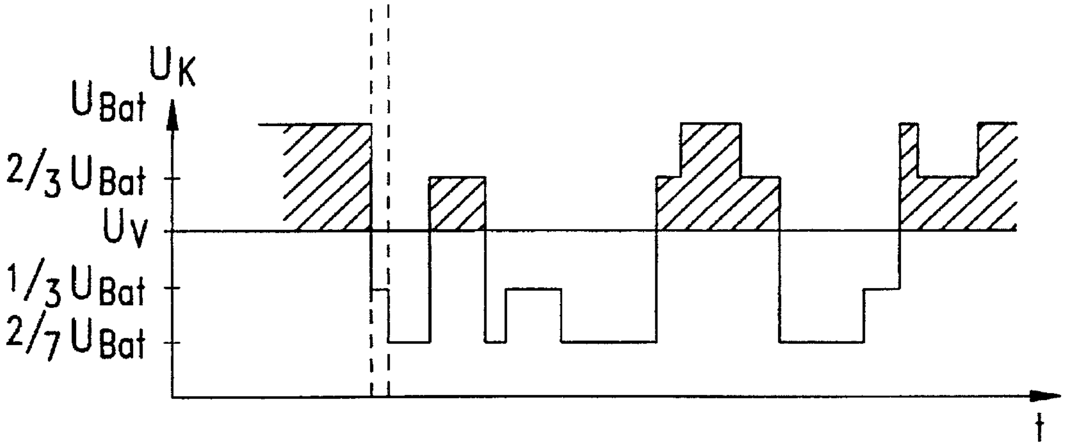

FIGS. 4a–4d illustrate the simultaneous transmission of data in both directions via the data transmission line 40. FIG. 4a indicates the phases at which the switch 25 is closed. The low phases of the signal illustrated correspond to the closed phases of the switch 25. The switch 25 is open during the high phases. In FIG. 4b, the low phases of the signal illustrated indicate the closed phases of the switch 15. The general case is illustrated in which the transitions between the low and high phases in the switches 15 and 25 do not take place temporally in parallel.

Figure 4C:
FIG. 4*c* shows the evaluation of the voltage levels by the first station for the simultaneously transmitted bit streams in accordance with FIGS. 4*a* and 4*b*.
Figure 4C:
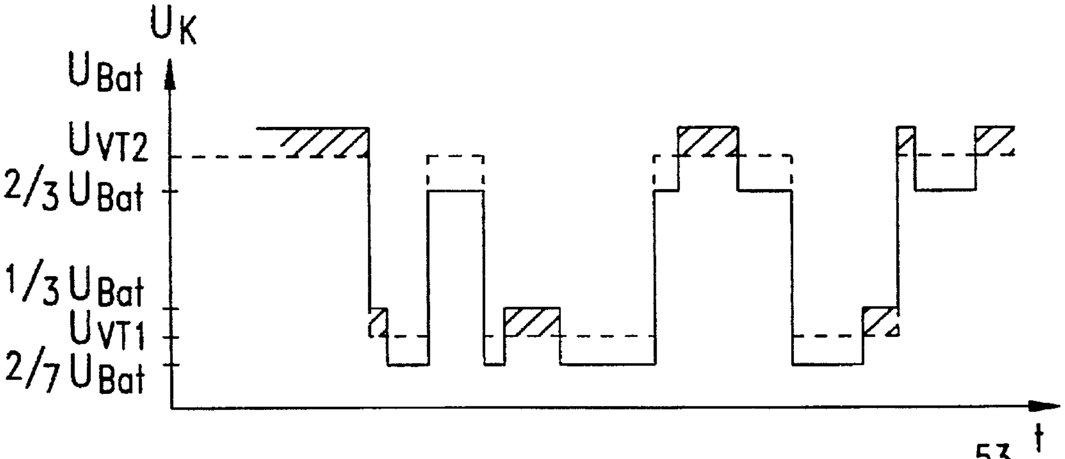
Figure 4D:
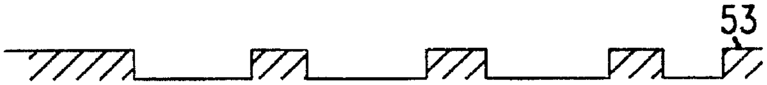
FIG. 4*d* shows the evaluation of the voltage levels by the second station for the simultaneously transmitted bit streams in accordance with FIGS. 4*a* and 4*b*.

FIG. 4c now shows the input signal at the non-inverting input of the receiving comparator 12 of the controller 10. The signal fluctuates between four different voltage levels, namely $U_{Bat}$, ⅔ $U_{Bat}$, ⅓ $U_{Bat}$ and $^2/_7$ $U_{Bat}$. The receiving comparator 12 compares the signal which is present at each point in time with the fixedly set reference potential $U_v$. The output signal 52 illustrated in the lower part of FIG. 4c is thereby produced at the output of the receiving comparator 12. This signal corresponds precisely to the signal (illustrated in FIG. 4a) transmitted by the microcomputer 21 of the external diagnostic device 20. Therefore, the controller 10 assigns the bit state "1" to each of the two upper voltage levels $U_{Bat}$ and ⅔ $U_{Bat}$. It correspondingly assigns the bit state "0" to the two lower levels ⅓ $U_{Bat}$ and $^2/_7$ $U_{Bat}$.

FIG. 4d once again shows the same signal on the data transmission line 40. However, the voltage potentials $U_{VT1}$ and $U_{VT2}$ are illustrated in addition. If the switch 25 is open, the receiving comparator 22 compares the input voltage at the non-inverting input with the reference voltage potential $U_{VT2}$. If the switch 25 is closed, the switch 32 is correspondingly closed, and the receiving comparator 22 compares the input voltage of the non-inverting input with the reference voltage $U_{VT1}$. The output signal 53 of the receiving comparator 22 is illustrated in the bottom part of FIG. 4d. This corresponds precisely to the signal (illustrated in FIG. 4b) transmitted by the microcomputer 11 of the controller 10.

Consequently, in this exemplary embodiment, too, it is possible to transmit data simultaneously in both directions via one data transmission line 40. However, owing to the small signal-to-noise ratio of $U_{VT1}$ and $U_{VT2}$ (+/−0.3 volt), the circuit in accordance with FIG. 3 is not strictly suitable for applications in which relatively large ground offsets between the stations can occur or alternatively relatively large line capacitances can lead to degradation of the voltage levels. In the case of such applications, the circuit in accordance with FIG. 2 offers greater interference immunity. Of course, it is also possible, if appropriate, to achieve a greater noise margin for the circuit in accordance with FIG. 3 by using different resistance values of the resistors and by means of different selection of the reference voltage potentials.

The present invention is not limited to the exemplary embodiments described above. Therefore, the external device may also be an external application device by means of which the program executions and data of the controller 10 can be optimized. Use of the present invention outside of the automotive sector is also readily conceivable. If a plurality of electronic controllers, which are all interconnected by a serial bus, should happen to be employed in a motor vehicle, the present invention can also readily be employed in this case. The external diagnostic device is then connected to this serial data transmission line and selects for the communication in each case one of the controllers. The communication can take place simultaneously in both directions as described.

What is claimed is:

1. A device for a serial exchange of data comprising:

a first station including a first serial interface coupled to a common data transmission line, the first station further including first means for identifying, while data is being received, first and second bit states when first and second voltage levels, respectively, are present on the data transmission line; and a second station including a second serial interface coupled to the common data transmission line, the second station further including second means for identifying, while data is being received, the first and second bit states dependent upon whether or not a predetermined current flow is present on the data transmission line, wherein the first means for identifying includes a receiving comparator for comparing a voltage level on the data transmission line with a preselected reference potential.

2. The device according to claim 1, wherein the first station further includes means for permitting or interrupting, while data is being transmitted, the current flow on the data transmission line dependent upon the bit states by connecting the data transmission line to a supply potential or by interrupting the connection.

3. The device according to claim 2, wherein the supply potential is ground.

4. The device according to claim 1, wherein the second station further includes means for applying, while data is being transmitted, a preselected voltage potential to the data transmission line dependent upon the bit states.

5. The device according to claim 1, wherein the second means for identifying includes a measuring resistor coupled between the data transmission line and a supply potential, and a comparator for determining a voltage drop across the measuring resistor.

6. A device for a serial exchange of data comprising:

a first station including a first serial interface coupled to a common data transmission line;

a second station including a second serial interface coupled to the common data transmission line; and means for producing, while data is being transmitted, first, second, third and fourth different voltage levels on the data transmission line dependent upon a bit state being transmitted;

wherein the first and second stations include first and second means, respectively, for assigning, while data is being received, one of a first and second defined bit state to each of the first, second, third and fourth voltage levels.

7. The device according to claim 6, wherein the first, second, third and fourth voltage levels are selected from the group including $U_{Bat}$, ⅔ $U_{Bat}$, ⅓ $U_{Bat}$, and 2/7 $U_{Bat}$, wherein $U_{Bat}$ is a supply voltage.

8. The device according to claim 6, wherein each of the first and second means for assigning assigns the first defined bit state to two of the voltage levels and assigns the second defined bit state to two of the voltage levels.

9. The device according to claim 6, wherein:

the first voltage level is greater than the second voltage level;

the second voltage level is greater than the third voltage level;

the third voltage level is greater than the fourth voltage level;

the first means for assigning assigns the first defined bit state to the first and second voltage levels and the second defined bit state to the third and fourth voltage levels; and the second means for assigning assigns the first defined bit state to the first and third voltage levels and the second defined bit state to the second and fourth voltage levels.

10. The device according to claim 9, wherein:

the first voltage level is $U_{Bat}$;

the second voltage level is ⅔ $U_{Bat}$;

the third voltage level is ⅓ $U_{Bat}$;

the fourth voltage level is 2/7 $U_{Bat}$; and $U_{Bat}$ is a supply voltage.

11. The device according to claim 6, wherein the second station includes a receiving comparator for comparing a voltage level on the data transmission line with one of two reference voltage sources, and a switch for switching between the reference voltage sources in sequence with bits transmitted by the second station.

12. The device according to claim 6, wherein the means for producing includes:

in the first station, a first resistor coupled to the data transmission line and, via a first switch, to a first supply potential; and in the second station, a second resistor coupled between the data transmission line and a second supply potential, and a third resistor and a second switch coupled between the data transmission line and the first supply potential.

13. The device according to claim 12, wherein the first supply potential is ground.

14. The device according to claim 6, wherein:

the first station includes a motor vehicle controller, the motor vehicle controller including at least one of an engine controller, a transmission controller, and a braking controller; and the second station includes at least one of an externally connectable diagnostic device and an externally connectable application device.

15. A device for a serial exchange of data comprising:

a first station including a first serial interface coupled to a common data transmission line, the first station further including first means for identifying, while data is being received, first and second bit states when first and second voltage levels, respectively, are present on the data transmission line; and a second station including a switching device and a second serial interface coupled to the common data transmission line, the second station further including second means for identifying, while data is being received, the first and second bit states dependent upon whether or not a predetermined current flow is present on the data transmission line, the switching device selectively coupling to at least one of a supply voltage device and a predetermined reference voltage device.

16. A device for the serial exchange of data, comprising:

a first station including a serial interface coupled to a common data transmission line, the first station including first means for identifying, while data being received, first and second bit states when first and second voltage levels, respectively, are present on the data line for the reception of data, the first means including a receiving comparator comparing the first and second voltage levels with a predetermined reference voltage, wherein the first station includes second means for generating, while data is being transmitted, third and fourth different voltage levels on the data line as a function of the first and second bit states being transmitted, the serial interface simultaneously receiving and transmitting data.

17. The device for the serial exchange of data, comprising:

a first station including a serial interface coupled to a common data transmission line, the first station including first means for identifying, while data being received, first and second bit states when first and second voltage levels, respectively, are present on the data line for the reception of data, the first means including a receiving comparator comparing the first and second voltage levels with a predetermined reference voltage, wherein the first station includes second means for generating, while data is being transmitted, first and second current flows on the data line as a function of the first and second bit states being transmitted, the serial interface simultaneously receiving and transmitting data.

18. The device for the serial exchange of data, comprising:

a first station including a serial interface coupled to a common data transmission line, the first station including first means for identifying, while data being received, first and second bit states when first and second current levels, respectively, are present on the data line for the reception of data, the first means including a receiving comparator comparing the first and second voltage levels with a predetermined reference voltage, wherein the first station includes second means for generating, while data is being transmitted, first and second voltage levels on the data line as a function of the first and second bit states being transmitted, the second means including a switching device selectively coupling the data line to one of a supply voltage device and a predetermined reference voltage device as a function of the first and second bit states being transmitted, the serial interface simultaneously receiving and transmitting data.

* * * * *